UNITED STATES PATENT OFFICE 2,076,197

SULPHONATED ARYLAMINO ANTHRAQUINONE DYESTUFFS AND PROCESS FOR THEIR MANUFACTURE

Ernst Gutzwiller, Basel, Switzerland, assignor to the firm of Chemical Works formerly Sandoz, Basel, Switzerland No Drawing. Application May 3, 1934, Serial No. 723,802. In Germany February 16, 1934

24 Claims. (Cl. 260—60)

The present invention relates to new valuable anthraquinone dyestuffs and to a process for their manufacture.

It has been found that by treating sulphonated arylaminoanthraquinones containing in the aryl nucleus a free p-position to the —NH— group, with oxidizing agents, new condensation products are obtained. The course of the reaction can by way of example be shown by the following scheme, in which A represents an anthraquinone nucleus:

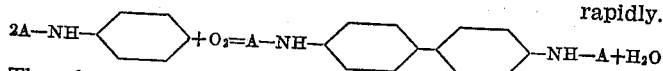

Therefore, the resulting products are derivatives of diphenyl.

The present invention provides, therefore, a process for the manufacture of anthraquinone derivatives of diaryl (for instance diphenyl or dinaphthyl), which are, when they are soluble in water, very valuable dyestuffs, dyeing animal fibres in various shades of excellent fastness properties.

To carry out the present invention, there may be used sulphonated anthraquinone derivatives of the general formula

wherein A represents a substituted or unsubstituted anthraquinone nucleus and R represents a benzene or a naphthalene nucleus containing a free p-position to the group —NH—. The arylamino anthraquinones may contain groups such as amino, alkylamino, alkyl, alkoxy, hydroxy, halogen, cyano or sulpho and further chains linking one 1-carbon of the anthraquinone nucleus to its 9-carbon, as this occurs in the case of anthrapyridones, anthrapyrimidones and anthrapyrimidines. The benzene or naphthalene nucleus may also contain substituents such as halogen, alkyl, alkoxy, substituted amino or sulpho groups.

The oxidation of the products cited above is, according to this invention, carried out in presence of solvents or dispersing agents with oxidizing agents selected from the class comprising organic and inorganic oxidizing agents such as manganese peroxide, lead peroxide, chromic acid, persulphates, quinones, organic peroxides and the like.

As solvents and dispersing agents, sulphuric acid of various degrees of concentration will be preferably employed, but also other solvents such as water, halogenated hydrocarbons, chlorosulphonic acid, acetic acid etc. can be used.

The treatment of the anthraquinone bodies with the oxidizing agents can be carried out at a temperature of —20° C to +50° C., but low temperatures will be preferred as the reaction proceeds steadier. The reaction will, therefore, be carried out preferably under cooling or at room temperature. The quantity of oxidizing agents will be so chosen that at least one atom of oxygen is allowed to react with the anthraquinone body; but it is preferable to use an excess of oxidizing agents in order to perform the reaction more rapidly.

The condensation products obtained in this manner can easily be isolated from the reaction mixture by the known methods, for example by filtering them or by salting them out in the case they are easily soluble in water. According to the starting products used they are more or less soluble in water, and in the case they are too difficultly soluble in water, it is indicated to subject them to a sulphonation, which can be carried out in the usual manner and with the known sulphonating agents such as sulphuric acid, fuming sulphuric acid, chlorosulphonic acid, or the sulphonic acid groups can be introduced by means of sulphites by replacing the halogen atom or another exchangeable group contained in the starting product.

As starting products, which will preferably be used in the present process, the following may be cited: 1-amino-4-anilidoanthraquinone-2-sulphonic acid, 1-amino-4-o-chloroanilidoanthraquinone-2-sulphonic acid, 1-amino-4-α-naphthylaminoanthraquinone-2-sulphonic acid, 1-amino-4-m-toluidoanthraquinone-2-sulphonic acid, 1-amino-4-o-anisididoanthraquinone-2-sulphonic acid, 1-amino-4-anilidoanthraquinone-2:5-disulphonic acid, 1-amino-4-anilidoanthraquinone-5-hydroxy-2-sulphonic acid, 1-amino-4-anilidoanthraquinone-5-chloro-2-sulphonic acid and the like.

As said above the compounds obtained are anthraquinone derivatives of a diaryl and are valuable dyestuffs for animal fibres such as wool and silk.

One object of the present invention is, therefore, to provide a process for the manufacture of soluble anthraquinone derivatives of a diaryl, which process consists in treating sulphonated arylaminoanthraquinones containing a free para-position in the aryl nucleus with oxidizing agents.

Another object of the present invention is the process for the treatment of anthraquinone compounds of the above cited nature with oxidizing agents, which process consists in carrying out the oxidation with solutions or suspensions of anthraquinone bodies in suitable solvents at a temperature of −20° C. to +50° C.

Further the present invention comprises the condensation products which are water-soluble anthraquinone derivatives of a diaryl containing 2 to 6 sulphonic acid groups and which correspond to the general formula

A—NH—R—R—NH—A wherein A represents a substituted or unsubstituted anthraquinone nucleus and —R—R— represents a diaryl nucleus such as diphenyl or dinaphthyl, which may contain substituents such as alkyl, alkoxy, halogen and sulpho.

The following examples, without being limitative, illustrate the present process, the parts being by weight:—

Example 1

8.5 parts of 1-amino-4-anilidoanthraquinone-2-sulphonic acid are dissolved in 60 parts of concentrated sulphuric acid and to the solution are added at 0° C. 1.6 parts of manganese peroxide (of about 70%). The reaction mixture is then stirred at this temperature until the oxidation is finished, then poured on ice or in water and the dyestuff isolated in the usual manner.

It dyes wool in greenish blue tints of an excellent fastness to milling and to light. On natural silk blue tints of excellent fastness properties will also be obtained.

Instead of 1-amino-4-anilidoanthraquinone-2-sulphonic acid other anthraquinone compounds such as 1-amino-4-o-chloroanilidoanthraquinone-2-sulphonic acid, 1-amino-4-α-naphthylaminoanthraquinone-2-sulphonic acid, 1-amino-4-m-toluidoanthraquinone-2-sulphonic acid, 1-amino-4-o-anisididoanthraquinone-2-sulphonic acid and so on can be used. It is also possible to use instead of manganese peroxide other oxidizing agents such as lead peroxide, chromic acid, persulphates, quinones, peroxides etc. The oxidation can also be carried out in another solvent or diluting agent; for instance the sulphuric acid can be replaced by chlorosulphonic acid. The products obtained according to the example can further be subjected to a sulphonating operation, in the case they are not sufficiently soluble in water. This is for instance the case, when 1-amino-4-α-naphthylaminoanthraquinone-2-sulphonic acid is subjected to the oxidation. The resulting product is soluble in water, but not to a sufficient degree. It is, therefore, indicated to sulphonate this condensation product for example with fuming sulphuric acid, in order to obtain a dyestuff that is easily soluble in water.

Example 2

11 parts of 1-amino-4-anilidoanthraquinone-2:5-disulphonic acid are dissolved in 50 parts of sulphuric acid of 93% and oxidized at room temperature with 2 parts of manganese peroxide. The isolated dyestuff dyes wool in blue shades.

Example 3

4 parts of 1-amino-2-sulpho-4-anilido-5-hydroxyanthraquinone are dissolved in 30 parts of concentrated sulphuric acid and diluted with water until the concentration of sulphuric acid becomes 50%. The obtained mixture is then cooled down to 0° C., 1 part of manganese peroxide is added thereto, and the reaction mixture stirred without further cooling until the oxidation is finished. The dyestuff thereby obtained dyes wool in blue-green shades of good fastness properties.

The dyestuff thus obtained can further be sulphonated by means of sulphonating agents and becomes very easily soluble in water.

Example 4

4,5 parts of 4-anilido-2-sulpho-1-carbethoxyanthrapyridone are dissolved in 30 parts of sulphuric acid of 93% and oxidized at 0° C. with 0.8 parts of manganese peroxide. The dyestuff thus produced and isolated in the usual manner dyes wool in very fast violet shades.

Example 5

8.5 parts of 1-amino-4-o-chloroanilidoanthraquinone-2-sulphonic acid are dissolved in 60 parts of sulphuric acid of 93%; to the solution thus obtained are added by portions and at 0° C. 4 parts of lead peroxide, and the reaction mixture is stirred until the oxidation is finished. The dyestuff thus obtained is isolated in any usual manner. It dyes wool in greenish-blue tints.

Example 6

8.5 parts of 1-amino-4-o-toluidoanthraquinone-2-sulphonic acid are dissolved in 65 parts of sulphuric acid of 90% and treated at 0° C. with 1.2 parts of quinone, which is added to the reaction mixture by small portions. After the oxidation is finished, the dyestuff is isolated in any usual way. It dyes wool in greenish-blue shades.

The following table shows the reactions of the new dyestuffs produced according to the examples.

| Example | Color of the dyestuff in dry form | Solution in water | Solution in H₂SO₄ | Solution in H₂SO₄+ HCHO |
|---|---|---|---|---|
| 1 | Dark blue | Green-blue | Blue | Blue. |
| 2 | Dark blue | Blue | Red-violet | Blue. |
| 3 | Dark blue | Green | Yellowish-green | Blue. |
| 4 | Violet | Violet | Blue-violet | Blue. |
| 5 | Dark blue | Blue-green | Blue | Becomes greener. |
| 6 | Dark blue | Blue-green | Blue | Becomes greener. |

What I claim is:—

1. A process for the manufacture of anthraquinone compounds, consisting in treating with an oxidizing agent selected from the class consisting of organic and inorganic oxidizing agents and in presence of sulphuric acid sulphonated arylaminoanthraquinones of the general formula

A—NH—R wherein A represents an anthraquinone nucleus and R an aromatic nucleus of the benzene and naphthalene series possessing a free para-position to the group —NH—.

2. A process for the manufacture of anthraquinone compounds, consisting in treating with an inorganic oxidizing agent and in presence of sulphuric acid of 40 to 100% strength sulphonated arylaminoanthraquinones of the general formula

A—NH—R wherein A represents an anthraquinone nucleus and R an aromatic nucleus of the benzene and naphthalene series possessing a free para-position to the group —NH—.

3. A process for the manufacture of anthraquinone compounds, consisting in treating with manganese peroxide at a temperature of —20° to +50° C. and in presence of sulphuric acid of 40 to 100% strength sulphonated arylaminoanthraquinones of the general formula

wherein A represents an anthraquinone nucleus and R an aromatic nucleus of the benzene and naphthalene series possessing a free para-position to the group —NH—.

4. A process for the manufacture of anthraquinone compounds, consisting in treating with manganese peroxide at a temperature of —20° to +50° C. and in presence of sulphuric acid of 40 to 100% strength sulphonated arylaminoanthraquinones of the general formula

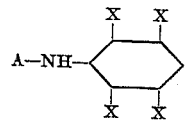

wherein A represents an anthraquinone nucleus and X represents a member of the group consisting of hydrogen, alkyl, alkoxy, acylamino, halogen and sulpho groups.

5. A process for the manufacture of anthraquinone compounds, consisting in treating with manganese peroxide at a temperature of —20° to +50° C. and in presence of sulphuric acid of 40 to 100% strength sulphonated arylaminoanthraquinones of the general formula

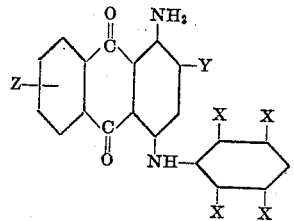

wherein Y represents a member of the group consisting of hydrogen, alkyl, alkoxy, halogen, cyano and sulpho, Z represents a member of the group consisting of hydrogen, halogen, hydroxy, alkoxy, amino, acylamino and sulpho, and X represents a member of the group consisting of hydrogen, alkyl, alkoxy, acylamino, halogen and sulpho groups.

6. A process for the manufacture of anthraquinone compounds, consisting in treating with manganese peroxide at a temperature of —20° to +50° C. and in presence of sulphuric acid of 40 to 100% strength sulphonated arylaminoanthraquinones of the general formula

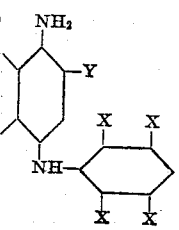

wherein Y represents a member of the group consisting of hydrogen, alkyl, alkoxy, halogen, cyano and sulpho, and X represents a member of the group consisting of hydrogen, alkyl, alkoxy, acylamino, halogen and sulpho groups.

7. A process for the manufacture of anthraquinone compounds, consisting in treating with manganese peroxide at a temperature of —20° to +50° C. and in presence of sulphuric acid of 40 to 100% strength arylaminoanthraquinones of the general formula

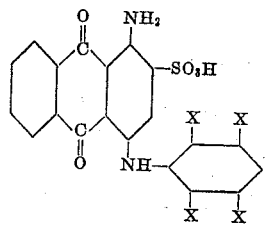

wherein X represents a member of the group consisting of hydrogen, alkyl, alkoxy, acylamino, halogen and sulpho groups.

8. A process for the manufacture of an anthraquinone dyestuff, consisting in treating 1-amino-4-phenylamino-anthraquinone-2-sulphonic acid with manganese peroxide at a temperature of —20° to +50° C. and in presence of sulphuric acid of 40–100% strength.

9. A process for the manufacture of an anthraquinone dyestuff, consisting in treating 1-amino-4-(o-chlorophenyl)-aminoanthraquinone-2-sulphonic acid with manganese peroxide at a temperature of —20° to +50° C. and in presence of sulphuric acid of 40–100% strength.

10. A process for the manufacture of an anthraquinone dyestuff, consisting in treating 1-amino-4-(o-toluido)-anthraquinone-2-sulphonic acid with manganese peroxide at a temperature of —20° to +50° C. and in presence of sulphuric acid of 40–100% strength.

11. The sulphonated anthraquinone compounds of the general formula

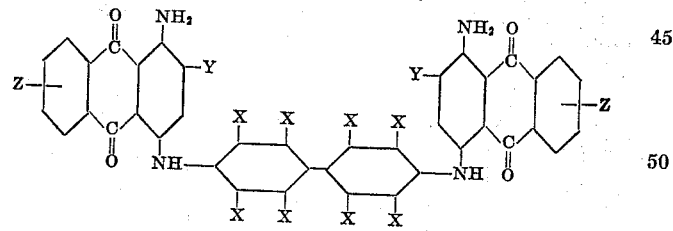

wherein X represents a member of the group consisting of hydrogen, alkyl, alkoxy, acylamino, halogen and sulpho, Y represents a member of the group consisting of hydrogen, alkyl, alkoxy, halogen, cyano and sulpho, and Z represents a member of the group consisting of hydrogen, halogen, hydroxy, alkoxy, amino and sulpho groups, said compounds constituting in dry state dark powders which are soluble in water and dye animal fibres in green to blue shades of excellent fastness properties.

12. The anthraquinone compounds of the general formula

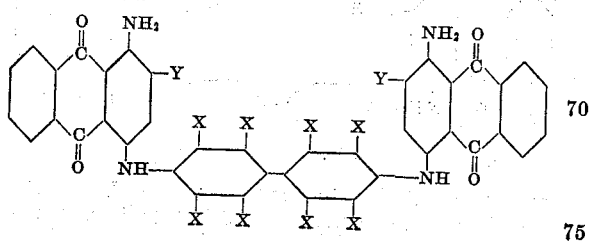

wherein X represents a member of the group consisting of hydrogen, alkyl, alkoxy, acylamino, halogen and sulpho, and Y represents a member of the group consisting of hydrogen, alkyl, alkoxy, halogen, cyano and sulpho groups, said compounds constituting in dry state dark powders which are soluble in water and dye animal fibres in blue shades of excellent fastness properties.

13. The anthraquinone compounds of the general formula

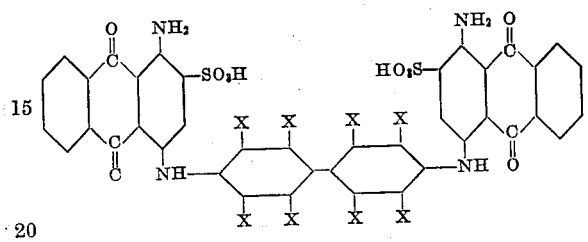

wherein X represents a member of the group consisting of hydrogen, alkyl, alkoxy, acylamino, halogen and sulpho groups, said compounds constituting in dry state dark powders which are soluble in water with a blue coloration and dye animal fibres in blue shades of excellent fastness properties.

14. The anthraquinone compound of the formula

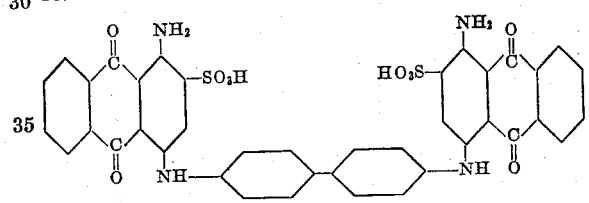

which constitues in dry state a dark-blue powder, soluble in water with a green-blue and in concentrated sulphuric acid with a blue coloration and which dyes animal fibres in greenish-blue shades of excellent fastness properties.

15. The anthraquinone compound of the formula

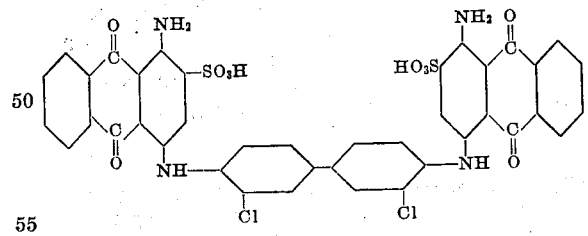

which constitutes in dry state a dark powder soluble in water with a greenish-blue and in concentrated sulphuric acid with a blue coloration and which dyes animal fibres in blue shades of excellent fastness properties.

16. The anthraquinone compound of the formula

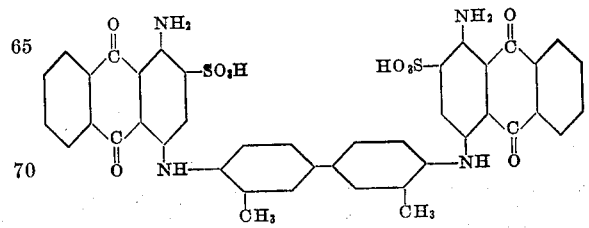

which constitutes in dry state a dark powder soluble in water with a greenish blue, in concentrated sulphuric acid with a blue-coloration and which dyes animal fibres in blue shades of excellent fastness properties.

17. A process for the manufacture of anthraquinone dye compounds, consisting in treating with manganese peroxide at a temperature of —20° to +50° C. and in presence of sulphuric acid of 40 to 100% strength sulphonated arylaminoanthraquinones of the general formula

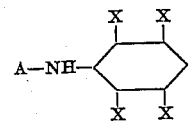

wherein A represents an anthraquinone nucleus and X represents a shade modifying substituent selected from the group consisting of hydrogen, alkyl, alkoxy, acylamino, halogen and sulpho groups.

18. A process for the manufacture of anthraquinone dye compounds, consisting in treating with manganese peroxide at a temperature of —20° to +50° C. and in presence of sulphuric acid of 40 to 100% strength sulphonated arylaminoanthraquinones of the general formula

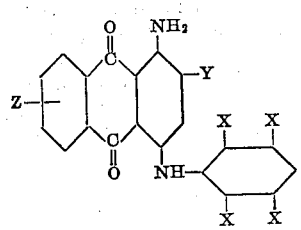

wherein Y represents a shade modifying substituent selected from the group consisting of hydrogen, alkyl, alkoxy, halogen, cyano and sulpho, Z represents a shade modifying substituent selected from the group consisting of hydrogen, halogen, hydroxy, alkoxy, amino, acylamino and sulpho, and X represents a shade modifying substituent selected from the group consisting of hydrogen, alkyl, alkoxy, acylamino, halogen and sulpho groups.

19. A process for the manufacture of anthraquinone dye compounds, consisting in treating with manganese peroxide at a temperature of —20° to +50° C. and in presence of sulphuric acid of 40 to 100% strength sulphonated arylaminoanthraquinones of the general formula

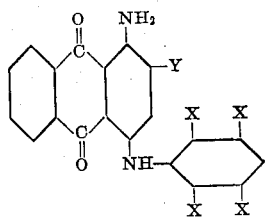

wherein Y represents a shade modifying substituent selected from the group consisting of hydrogen, alkyl, alkoxy, halogen, cyano and sulpho, and X represents a shade modifying substitutent selected from the group consisting of hydrogen, alkyl, alkoxy, acylamino, halogen and sulpho groups.

20. A process for the manufacture of anthraquinone dye compounds, consisting in treating with manganese peroxide at a temperature of —20° to +50° C. and in presence of sulphuric acid of 40 to 100% strength arylaminoanthraquinones of the general formula

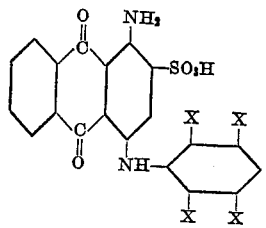

wherein X represents a shade modifying substituent selected from the group consisting of hydrogen, alkyl, alkoxy, acylamino, halogen and sulpho groups.

21. The sulphonated anthraquinone dye compounds of the general formula

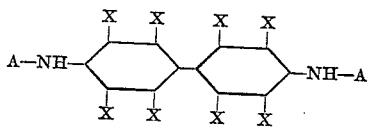

wherein A represents an anthraquinone nucleus and X represents a shade modifying substituent selected from the group consisting of hydrogen, alkyl, alkoxy, acylamino, halogen and sulpho groups, said compounds constituting in dry state yellow-orange, red, violet to dark powders, which are soluble in water and dye animal fibres in yellow-orange, red-violet to blue shades.

22. The sulphonated anthraquinone dye compounds of the general formula

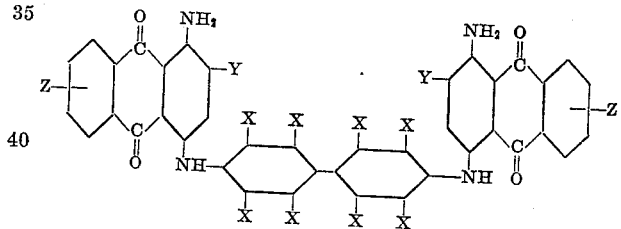

wherein X represents a shade modifying substituent selected from the group consisting of hydrogen, alkyl, alkoxy, acylamino, halogen and sulpho groups, Y represents a shade modifying substituent selected from the group consisting of hydrogen, alkyl, alkoxy, halogen, cyano and sulpho groups, and Z represents a shade modifying substituent selected from the group consisting of hydrogen, halogen, hydroxy, alkoxy, amino, and sulpho groups, said compounds constituting in dry state dark powders which are soluble in water and dye animal fibres in green to blue shades of excellent fastness properties.

23. The anthraquinone dye compounds of the general formula

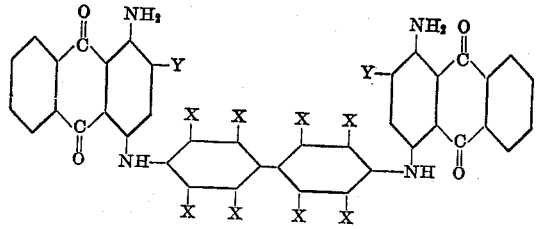

wherein X represents a shade modifying substituent selected from the group consisting of hydrogen, alkyl, alkoxy, acylamino, halogen and sulpho groups and Y represents a shade modifying substituent selected from the group consisting of hydrogen, alkyl, alkoxy, halogen, cyano and sulpho groups, said compounds constituting in dry state dark powders which are soluble in water and dye animal fibres in blue shades of excellent fastness properties.

24. The anthraquinone dye compounds of the general formula

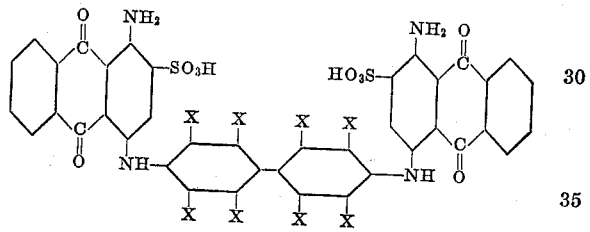

wherein X represents a shade modifying substituent selected from the group consisting of hydrogen, alkyl, alkoxy, acylamino, halogen and sulpho groups, said compounds constituting in dry state dark powders which are soluble in water with a blue coloration and dye animal fibres in blue shades of excellent fastness properties.

ERNST GUTZWILLER.